United States Patent [19]

Mason

[11] Patent Number: 5,171,441
[45] Date of Patent: Dec. 15, 1992

[54] APPARATUS FOR TREATING WATER AND/OR WASTEWATER

[76] Inventor: James A. Mason, P.O. Box 605, Theodore, Ala. 36590

[21] Appl. No.: 755,825

[22] Filed: Sep. 6, 1991

Related U.S. Application Data

[63] Continuation-in-part of Ser. No. 438,847, Nov. 20, 1989, abandoned.

[51] Int. Cl.$^5$ .............................................. C02F 1/76
[52] U.S. Cl. ................................... 210/206; 210/754; 210/764; 422/242; 422/295
[58] Field of Search ............... 210/754, 755, 756, 764, 210/198.1, 199, 205, 206; 422/28, 37, 242, 295

[56] References Cited

U.S. PATENT DOCUMENTS

| | | | |
|---|---|---|---|
| 3,867,509 | 2/1975 | Geiger et al. | 423/224 |
| 4,084,747 | 4/1978 | Alliger | 239/4 |
| 4,801,353 | 1/1989 | Mason | 162/73 |
| 4,968,501 | 11/1990 | Mason | 423/243 |

FOREIGN PATENT DOCUMENTS 959238 12/1974 Canada ............................. 423/477

Primary Examiner—Ivars Cintins
Assistant Examiner—Neil M. McCarthy
Attorney, Agent, or Firm—George L. Williamson

[57] ABSTRACT

The present invention describes a novel method and apparatus for treating and/or disinfecting water and/or wastewater wherein the contact vessel is sealed and under greater than atmospheric pressure having a detention time of no more than 5 minutes.

3 Claims, 1 Drawing Sheet

APPARATUS FOR TREATING WATER AND/OR WASTEWATER

BACKGROUND OF THE INVENTION

This application is a continuation-in-part of application Ser. No. 07/438,847 filed Nov. 20, 1989 now abandoned.

This invention generally relates to a method and apparatus for using mixtures of various organic acids and sodium chlorite for the production of chlorine containing compounds in concentrations suitable for use as an oxidizing and disinfecting agent in various industrial processes, more particularly, for treating and disinfecting water and/or wastewater. Other exemplary industrial processes where chlorine containing compounds may be used as an oxidizing agent include use as a whitening agent in the paper industry and as a water treatment chemical in the oil recovery industry; additionally, other industries where this invention may be useful include chicken and turkey processing, seafood processing including fish and shrimp, vegetable and fruit processing, for removing $H_2S$ and sulfur from wastewater from the mining of silver, gold and other metals and precious metals, for both domestic and industrial wastewater, waters used in cooling towers and the like, for both domestic and industrial freshwater supply, beef and pork rendering, and for removing $H_2S$ from natural gas and crude oil wells.

Methods and/or apparatuses for treating water and/or wastewater with chlorine dioxide produced from mixing organic acids and chlorites have been described in the prior art. Callerame, in Canadian Patent No. 959,238, described a method and apparatus for producing chlorine dioxide in water. Tice, et al, in U.S. Pat. No. 4,585,482, described a long-acting biocidal composition produced from a chlorine dioxide-liberate compound and an organic acid. Key, et al, in U.S. Pat. No. 4,310,425, described a system of producing chlorine dioxide for use as an anti-bacterial agent in oil field drilling fluid. Wentworth, in U.S. Pat. No. 3,082,146, described a method for the treatment of water using a residual chlorous acid concentration by mixing therewith sodium chlorite and a peroxygen compound. Alliger, in U.S. Pat. No. 4,084,747, described a germ-killing composition produced by contacting lactic acid with sodium chlorite in an aqueous media. Alcide Corporation, in International Application No. PCT/US 85/00470 described a process for disinfecting a substrate comprising contacting the substrate with a composition comprising a chlorine-dioxide liberating compound, such as sodium chlorite, with sufficient organic acid to lower the pH of the composition to less than about 7.

Mason, in U.S. Pat. No. 4,925,645, described a process for producing a mixture containing chlorine dioxide which comprised several steps. Mason, in U.S. Pat. No. 4,892,148, described a process of oil recovery including the steps of injecting flooding waters into oil bearing subterranean formations which waters contained a mixture of a salt of lactic acid and chlorous acid.

The design, operation and control of chlorine contact chambers is thoroughly discussed in the text entitled "Wastewater Engineering Collection Treatment Disposal" by Metcalf and Eddy, Inc., McGraw-Hill Book Company, New York, N.Y., 1972, pages 470-478. This text discloses minimum retention times for chlorine contact chambers in the range of 15-30 minutes.

Typical chlorine contact chambers are constructed of either metal, such as steel, fiberglass, or concrete. They are normally open chambers and mixing may be provided by hydraulic turbulence, mechanical means or having the chambers be compartmentalized.

However, none of the prior art cited above discloses the unique method and apparatus for treating and/or disinfecting water and/or wastewater as does the instant application.

SUMMARY OF THE INVENTION

One of the primary objectives and advantages of the present invention is that it allows for the formation of chlorine dioxide in an aqueous solution using bulk quantity reactants which allows for the production of a source of the chlorine dioxide off site rather than on-site at the particular industrial installation of importance. Off site production capability is important because it allows for a much safer generating process for chlorine dioxide whereby the risk of fire and explosion are minimized. It is anticipated that the solutions containing chlorine dioxide would be shipped to the plant site by, e.g., tank truck or railway tank car. Furthermore, the present invention allows for the mixing and formation of the chlorine dioxide in an aqueous solution involving bulk quantities and mixing ratios which are extremely simple and basic whereby more or less generally lesser-trained personnel can accomplish the production of the chlorine dioxide. This method allows for the delivery of a source of chlorine dioxide to a plant site by merely transporting an aqueous solution which is not now done because chlorine dioxide can not be safely transported and therefore is now generally generated on-site.

According to the invention there is provided a method of forming chlorine dioxide in an aqueous solution from the reaction of an organic hydroxy acid or carboxylic acid with a chlorite of an alkali metal or alkaline earth metal to yield a salt of the acid and chlorous acid. This reaction is carried out at a $pH < 7$ and at a temperature of $<120°$ F., generally in the range of approximately, 60° F. to 80° F. most preferably at about 62° F. The aqueous solution containing chlorine dioxide formed from the aforementioned reaction is stable and can be safely transported by common carrier, e.g., tank truck or railway tank car, to the plant site. Lab tests have indicated that solutions made by mixing different organic acids, including lactic, citric, malic and tartaric acid, with sodium chlorite retained their concentrations within 2% plus or minus for at least 30 days.

The aforementioned reaction initiates a chain of reactions leading to the production of chlorine dioxide which is believed to be a central chemical agent of the present invention which makes it effective for the treatment and disinfection of water and/or wastewater. These further reactions, generally, involve the oxidation of various organic compounds or destruction of pathogens by either chlorous acid, chlorine dioxide or chlorine gas and will be further described by use of chemical equations in the following section of this specification.

Note that it may be feasible to substitute other alkali metal or alkaline earth metal chlorites in either liquid or solid form as a source of the chlorite referred to in this specification.

The aqueous solutions containing the chlorine compounds are then injected, mixed with or contacted with water and/or wastewater in some type of container, conduit, pipe, chamber, vessel or other enclosed space or cavity so that the chlorine compounds become thoroughly mixed with the water and/or wastewater for sufficient time so that treatment and disinfection of the water and/or wastewater occurs.

A key element and claim of the present invention concerns the construction and operation of the container, chamber or vessel wherein the chlorine compounds are contacted with the water and/or wastewater. According to the present invention, the chamber or other enclosed space must be constructed and operated so that it provides an airtight or sealed chamber for a period of time effective or sufficient for the treatment and disinfection to occur. Furthermore, the chamber may be constructed and operated so that the surface of the water and/or wastewater contained therein is under a pressure greater than atmospheric pressure. It is believed that having the chamber be airtight or under a pressure greater than atmospheric is partially responsible for the unexpectedly rapid and high levels of treatment and/or disinfection resulting from the present invention, probably due to the fact that the individual molecules of the chlorine containing compounds are prevented and/or minimized from escaping from the water and/or wastewater, and held in close contact with the individual molecules of the water and/or wastewater. The increased pressures may also cause a greater amount of the chlorine containing compounds to dissolve in the water and/or wastewater.

It is believed that means for increasing the pressure on the surface of the water and/or wastewater in the contact chamber to greater than atmospheric would include (1) sizing and/or valving the exit or effluent outlet orifice for less flow than the entrance or influent orifice, (2) using some type of mechanical means such as a pump to put pressure on the contact chamber, and (3) elevating the effluent outlet line to an elevation above the contact chamber. It is believed that pressures in the range of about 1 to about 2 atmospheres are preferable to insure rapid and efficient treatment and yet be compatible with existing structures and construction techniques. Also, note that the pressure may vary due to the diurnal flow variation.

As previously mentioned, typical existing chlorine contact chambers in widespread use currently are constructed normally of steel or concrete and are open. Therefore, in order to retrofit existing structures according to the present invention the existing open chambers would have to be closed and a method of applying a pressure to the contents contained in the chamber would have to be adapted to the existing chamber. It is therefore critical that the present invention be compatible with existing chambers to make the retrofitting of the existing chambers economically feasible. Since the chlorine contact chambers currently existing are frequently constructed of concrete, they cannot stand high internal pressures without leaking, cracking or possibly having a structural failure. Therefore, it is essential that the internal pressures be maintained in a relatively low pressure range.

The basic design an construction of chlorine contact chambers has been essentially unchanged for the last thirty to forty years. Open contact chambers are in widespread use throughout the nations of the developed world. The present invention is a marked improvement over the existing art and represents a major design, construction and operation improvement which can lead to major cost savings in the construction and operation of disinfection chambers used either by themselves or in conjunction with water and/or wastewater treatment systems.

It is believed that contact, detention or residence times in the contact chamber in the range of about 30 seconds to about 5 minutes are preferable. Note that these very short contact times are an unexpected result and advantage of the present invention.

The chlorine containing compounds produced and used by the method of the present invention are intended for use as a bactericide to inhibit the growth of bacteria and other microbes and pathogens found in water and/or wastewater in order to make it potable or to disinfect it as the case may be. It is also intended to remove color, odor, taste, iron, manganese and hydrogen sulfides that may be present in the water and/or wastewater. For example, such problems may be caused by algae, phenols and/or the presence of hydrogen sulfide. A particular advantage of the present invention is that the production for trihalomethane, other undesirable polychlorinated hydrocarbons such as dioxins, and chlorates and chlorites are minimized and/or eliminated.

Note it is believed that the organic acids mentioned in this specification may include lactic, citric, tartaric, malic, oxalic, glycolic and mandelic acids and/or other organic hydroxy acids and carboxylic acids.

BRIEF DESCRIPTION OF DRAWINGS

FIG. 3 is a schematic representation of a third exemplary embodiment of the present invention drawn in non-scale elevation.

Figure 1:
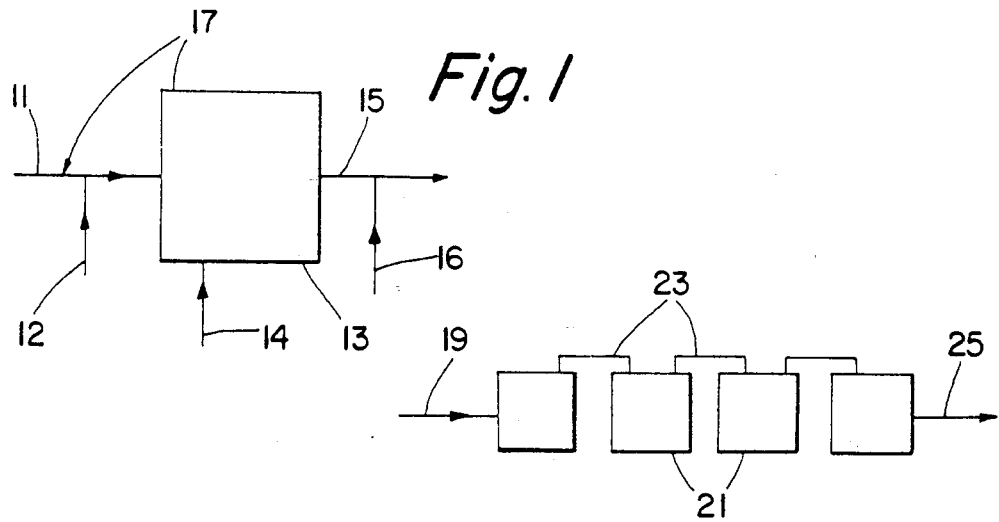
FIG. 1 is a schematic representation of one exemplary embodiment of the present invention.

DESCRIPTION OF METHOD AND APPARATUS FOR TREATING AND DISINFECTING WATER AND/OR WASTEWATER

A more detailed description of the present invention follows in the form of exemplary chemical equations and examples.

The reactions utilized in the method of the present invention are believed to be as follows:

1. $CH_3CH(OH)COOH$ + $NaClO_2$ ⟶
   (lactic acid)    (sodium chlorite)

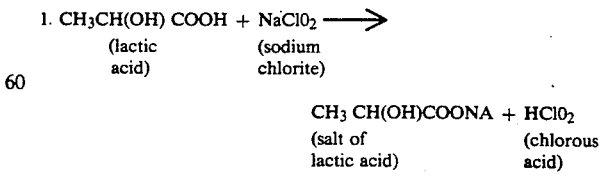

$CH_3CH(OH)COONA$ + $HClO_2$
(salt of lactic acid)    (chlorous acid)

It is believed that citric acid may be substituted for lactic acid. Also, it is believed that malic, tartaric, glycolic, oxalic and mandelic acid may be substituted for lactic acid.

2. a. $HClO_2$ + Non Fully Oxidized Organics $\longrightarrow$
   (chlorous acid) Inorganics or Pathogens $HClO$ + Oxidized organics,
   Inorganics or Pathogens
   (Hypochlorous acid)

b. $HClO_2 \longrightarrow HClO + HClO_3$
   (chlorous   (Hypochlorous  (chloric
   acid)       acid)           acid)

This reaction 2.b. is not desirable, but it will occur simultaneously with reaction 3., but not necessarily at the same rate.

3. $HClO + 2HClO_2 \longrightarrow 2ClO_2 + H_2O + HCl$
   (This reaction occurs in absence of chloride ion)

4. $ClO_2$ + Non Fully Oxidized Organics $\longrightarrow$
   Inorganics of Pathogens $HClO_2$ + Oxidized Organics
   Inorganics or Pathogens Reaction 3. provides chloride ions, therefore the following reaction occurs.

5. $HClO + Cl^- + H^+ \rightleftharpoons Cl_2 + H_2O$

The Chlorine reaction with organics, inorganics or pathogens is generally thought to be primarily an Oxidation as follows:

6. $Cl_2$ + Organics Inorganics $\longrightarrow$ Oxidized Organics,
   or Pathogens                                 Inorganics or Pathogens The above reactions are carried out at a pH less than 7.

In practice, the reactants and reactions are produced by mixing bulk quantities of sodium chlorite and certain organic acids. Furthermore, it is believed that in the above reaction Number 1. that citric, malic, tartaric, glycolic, oxalic and mandelic acids may be substituted for the lactic acid to produce a salt of the acid and chlorous acid in an aqueous solution.

The above reaction Number 1. is accomplished by mixing the reactants together at atmospheric pressure in an aqueous solution with the water temperature being approximately 62° F. being in the range of 60° F. to 80° F. The higher water temperatures nearing 80° F. can be used if necessary to increase the reaction speed. Higher water temperatures may be feasible.

The aqueous solutions of the chlorine containing compounds produced by the aforementioned reactions may be prepared according to the following steps: (a) a first solution is formed by adding an organic acid into the water in a reaction vessel; (b) thereafter the first solution is mixed by stirring; (c) a second solution is then formed by introducing sodium chlorite into the first solution, this addition being followed by additional mixing; (d) the second solution is then stirred and mixed. Note that it is believed that several different organic acids may be used to produce the aqueous solutions for the production of the chlorine containing compounds. Also note that the chlorine containing compounds formed by these reaction steps is known to be very stable as aforementioned. It is believed that the aforementioned steps for producing the chlorine containing compounds are critical in order to assure that the mixtures have all of the properties of the present invention.

It should be noted that the aforementioned reactions result in a mixture of species of compounds which is believed to include chlorous acid, chloric acid, chlorine dioxide or chlorine; it is further believed that the powerful oxidation and/or disinfection nature and characteristics of the present invention is due to a mixture of these compounds acting either jointly or singularly, or, acting as a mixture of these chemical substances.

The aqueous solutions containing the chlorine compounds are then injected, mixed with or contacted with water and/or wastewater in some type of container, conduit, pipe, chamber, vessel or other enclosed space or cavity so that the chlorine compounds become thoroughly mixed with the water and/or wastewater for sufficient time so that treatment and disinfection of the water and/or wastewater occurs.

It is expected that the aqueous solution of the chlorine containing substances would normally be injected following the typical primary, secondary or tertiary water and/or wastewater treatment system, i.e., where final chlorination is normally accomplished. However, other points of injection are likely also, e.g., prior to primary sedimentation.

The above reactions produces aqueous solutions containing very high concentrations of chlorine dioxide ranging from generally about 4,000 ppm to about 80,000 ppm. Furthermore, the chlorine dioxide produced by the present invention appears to have more oxidizing and pathogen destroying power on a per unit basis than chlorine dioxide produced by other methods. Mixtures of about 4,000 ppm to about 6,000 ppm chlorine dioxide commonly occur in these solutions.

Turning to FIG. 1, one exemplary schematic embodiment for using the present invention to treat or disinfect water and/or wastewater is shown. At 11, the influent line or inlet line to the contact chamber is shown with the contact chamber, or mixing vessel 13.

The effluent discharge line or outlet line is shown at 15. Note that the pressure of the contents of the mixing vessel is greater than about one atmosphere and that the detention time is about 30 seconds to about 5 minutes.

It is believed that means for increasing the pressure on the surface of the water and/or wastewater in the contact chamber to a pressure greater than atmospheric could include sizing and/or valving the exit or effluent outlet line, 15, so that it could carry less flow than the entrance or influent line, 11. Additionally, some type of mechanical means, e.g., a pump, could be used at, 17, to put pressure on the contact chamber. Note that the aqueous solution could alternatively be injected into the influent line, 11, either through the single line 12 or into the chamber, 13, through the single line 14.

Figure 2:
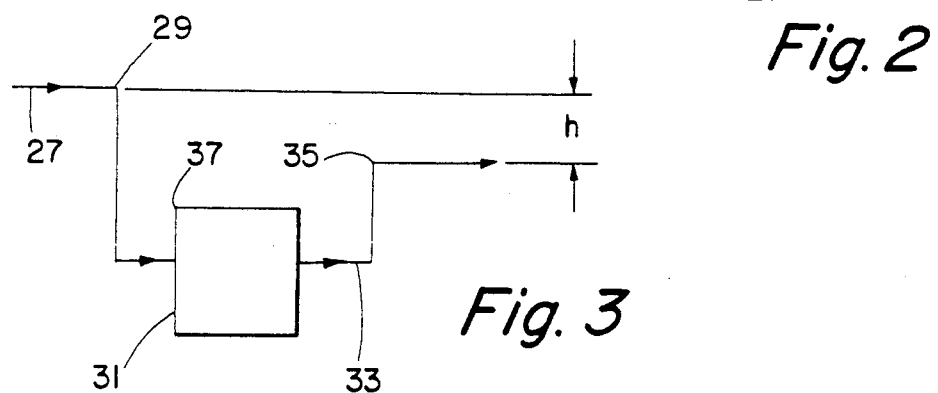
FIG. 2 is a schematic representation of a second exemplary embodiment using the present invention.

Turning to FIG. 2, a second exemplary schematic embodiment for using the present invention to treat or disinfect water and/or wastewater is shown. FIG. 2 is merely a series of more than one contact chamber using the teachings of the present invention. At 19, the influent line to the series of chambers is shown with greater than one chamber being shown at 21. Interconnecting piping between the chambers is shown at 23. The effluent discharge line from the chambers is shown at 25. The construction and operation of the embodiment shown in FIG. 2 is similar to the embodiment shown in FIG. 1.

Turning to FIG. 3, a third exemplary schematic embodiment of the present invention to treat or disinfect water and/or wastewater is shown. At 27, the influent line to the contact chamber is shown with the chamber, 31. The effluent discharge line is shown at 33. The embodiment of FIG. 3 has the influent line and effluent line designed to be constructed at certain elevations with respect to the contact chamber, 31, so that a pressure greater than atmospheric occurs on the contents of the contact chamber, 31. By example, the elevation of the influent line, 27, at the point, 29, is greater than the elevation of the effluent line, 33, at the point 35; and, the elevation of the effluent line, 33, at the point 35 is greater than the elevation of the contact chamber, 31, at the point 37. In other words, if the elevation at 29 is $h_1$; and, the elevation at 35 is $h_2$; and, elevation at 37 is $h_3$, then, $h_1 > h_2 > h_3$. It follows, according to the laws of physics, that the pressure on the liquid in the contact chamber, 31, would be greater than atmospheric pressure. Note that the differential elevation of the influent line, 27, over the elevation of the effluent line, 33, must be great enough so that a proper hydraulic gradient is maintained through the contact chamber in order that flow will occur from the direction of the influent line toward the effluent line because hydraulic friction losses in the piping and appurtenances, i.e., the chamber must be taken into consideration in the design. However, other possible configurations exist, e.g., $h_1 > h_2 = h_3$ or $h_1 > h_3 > h_2$, which would also cause the pressure on the liquid in the contact chamber to be greater than atmospheric. As used herein, the term elevation is used to mean the height to which something is elevated.

Normally, the aqueous solution containing the chlorine containing substances would be injected into the mixing vessel or contact chamber, i.e., in FIGS. 1, 2, 3, these would be shown at 13, 21, and 31, respectively. Alternatively, the aqueous solutions of the chlorine containing compounds could be injected into the influent lines respectively in FIGS. 1, 2 and 3 prior to the contact chamber itself. Furthermore, mixing by hydraulic turbulence at or near the point of addition of the chlorine containing compounds to the water and/or wastewater is recommended if mechanical mixing is not used. Furthermore, it is possible to achieve mixing in the contact chamber by compartmentalizing the chlorine contact chamber.

Figure 4:
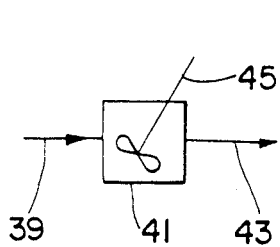
FIG. 4 is a schematic representation of one type of mixing chamber.

Turning to FIG. 4, there is shown another type of contact chamber having mechanical mixing means. The influent line, 39, is shown with the contact chamber, 41, and the effluent line, 43. The mechanical mixing means is shown at 45.

Figure 5:
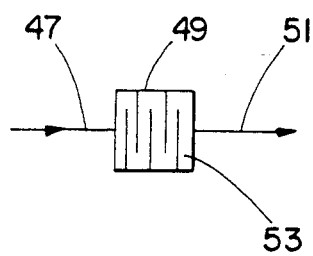
FIG. 5 is a schematic representation of a second type of mixing chamber using non-mechanical mixing means shown as a plan view.

Turning to FIG. 5, there is shown another type of contact chamber having a certain type of compartmentalization. The influent line is shown at 47, with the contact chamber being at 49. The effluent line is shown at 51. The contact chamber is shown having compartmentalized partitions, 53, constructed in it so as to route the flow of water and/or wastewater through it in such a manner as to assure mixing.

Figure 6:
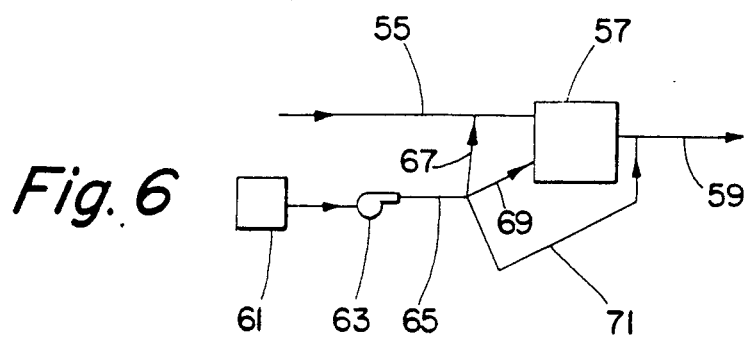
FIG. 6 is a schematic representation of one exemplary embodiment of applicant's invention.

Turning to FIG. 6, there is shown a schematic embodiment of applicant's invention in somewhat of an operative connection. There is shown an influent line, 55, to a contact chamber, 57, having an effluent line, 59. Additionally, there is shown a vessel, 61, which contains the aqueous solution of the chlorine containing compounds, connected to an influent pump, 63, through the connecting line, 65, connecting thereto alternatively to the influent line, 55, through the line 67 or alternatively, to the contact chamber, 57, through line 69. As stated previously, it would be possible to inject the aqueous solution through line 67 into the influent line, 55, or directly into the contact chamber, 57, through the line, 69.

It should be understood that the teachings of this specification are given by way of illustration and explanation thereof and not by way of limitation because many changes in the invention may be effected without departing in anyway from the scope and spirit of this invention as disclosed in the drawings and claims contained herein.

I claim:

1. An apparatus for treating and disinfecting water and/or wastewater comprising:
   (a) a chamber;
   (b) said chamber having an inlet line and an outlet line for the water and/or wastewater;
   (c) means containing an aqueous solution of (1) an organic hydroxy acid or carboxylic acid and (2) an alkali metal or alkaline earth metal chlorite;
   (d) means for providing said aqueous solution to said chamber;
   (e) said chamber being sized to provide a detection time of no more than 5 minutes for the water and/or wastewater;
   (f) said chamber being sealed from the atmosphere; and
   (g) said chamber having means for providing a pressure of greater than 1 atmosphere on the contents of said chamber, said apparatus thereby effective to destroy substantially all bacteria, microbes and other pathogenic organisms in said water and/or wastewater.

2. The apparatus of claim 1, wherein: said means for providing a pressure of greater than 1 atmosphere on the contents of the chamber further comprises (a) having the elevation of the inlet line of said chamber be above the elevation of the outlet line of said chamber; (b) having the elevation of the outlet line of said chamber be above the elevation of the top of said chamber; and (c) whereby the liquid contents of said chamber are under greater than atmospheric pressure.

3. The apparatus of claim 1 wherein the contents of said chamber are under pressure ranging from about one atmosphere to about two atmospheres.

* * * * *